United States Patent
Kaita (10) Patent No.: US 7,430,469 B2
(45) Date of Patent: Sep. 30, 2008

(54) MOTOR VEHICLE CONTROL METHOD OF INTERNAL COMBUSTION ENGINE

(75) Inventor: Keiji Kaita, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 54 days.

(21) Appl. No.: 11/662,056

(22) PCT Filed: Sep. 17, 2004

(86) PCT No.: PCT/JP2004/014021

§ 371 (c)(1),
(2), (4) Date: Mar. 7, 2007

(87) PCT Pub. No.: WO2006/030528

PCT Pub. Date: Mar. 23, 2006

(65) Prior Publication Data

US 2007/0255485 A1    Nov. 1, 2007

(51) Int. Cl.
F02D 28/00    (2006.01)
G06F 7/70    (2006.01)

(52) U.S. Cl. .................. 701/102; 701/113; 123/516

(58) Field of Classification Search ............ 701/102, 701/103, 104, 113; 123/295, 305, 479, 516, 123/518, 520, 521, 179.3, 179.4, 179.16
See application file for complete search history.

(56) References Cited

U.S. PATENT DOCUMENTS

| 4,335,849 | A * | 6/1982 | van Bashuysen | 237/12.3 R |
|---|---|---|---|---|
| 5,377,644 | A * | 1/1995 | Krohm | 123/520 |
| 5,482,024 | A * | 1/1996 | Elliott | 123/516 |
| 5,924,412 | A * | 7/1999 | Suzuki et al. | 123/568.21 |
| 6,415,769 | B1 * | 7/2002 | Fisher et al. | 123/486 |
| 6,561,166 | B2 * | 5/2003 | Halleron et al. | 123/519 |
| 6,679,201 | B2 * | 1/2004 | Murakami et al. | 123/41.1 |
| 6,786,191 | B2 * | 9/2004 | Foster | 123/198 F |
| 6,823,851 | B2 * | 11/2004 | Amano et al. | 123/520 |

FOREIGN PATENT DOCUMENTS

| JP | 06-032118 | 4/1994 |
|---|---|---|
| JP | 08-014118 | 1/1996 |
| JP | 08-165925 | 6/1996 |
| JP | 08-200127 A | 8/1996 |
| JP | 09-233601 | 9/1997 |

(Continued)

*Primary Examiner*—Willis R. Wolfe, Jr.
*Assistant Examiner*—Johnny H. Hoang
(74) *Attorney, Agent, or Firm*—Kenyon & Kenyon LLP (57) ABSTRACT

In a motor vehicle, when an intake air temperature Ta is not lower than a preset reference temperature Tref, warm-up drive control selectively uses an evaporated fuel processing acceleration operation curve, which gives a high level of a negative pressure in an intake manifold, to set a target drive point of an engine and controls the operation of the engine. This ensures good emission of the engine. When the intake air temperature Ta is lower than the preset reference temperature Tref and when the setting of a heating demand Hq requires heating, on the other hand, the warm-up drive control increases an EGR quantity from an ordinary level and switches over an operation mode of a cooling system for the engine to a warm-up circulation mode for making the flow of a cooling medium bypass a radiator.

14 Claims, 8 Drawing Sheets

FOREIGN PATENT DOCUMENTS

| | | |
|---|---|---|
| JP | 10-000921 | 1/1998 |
| JP | 10-203145 | 8/1998 |
| JP | 11-036921 A | 2/1999 |
| JP | 2001-213152 | 8/2001 |
| JP | 2002-174134 | 6/2002 |
| JP | 2002-221064 A | 8/2002 |
| JP | 2004-156513 A | 6/2004 |

* cited by examiner

Fig. 12

MOTOR VEHICLE CONTROL METHOD OF INTERNAL COMBUSTION ENGINE

This is a 371 national phase application of PCT/JP2004/014021 filed 17 Sep. 2004, the content of which is incorporated herein by reference.

TECHNICAL FIELD

The present invention relates to a motor vehicle and a control method of an internal combustion engine mounted on the motor vehicle.

BACKGROUND ART

A hybrid vehicle of one proposed arrangement specifies the timing for a restart of an engine, based on the inner temperature of a passenger compartment, the set temperature of an air conditioner in the passenger compartment, and the temperature of cooling water in an engine (see, for example, Japanese Patent Laid-Open Gazette No. H09-233601). When the temperature difference between the inner temperature of the passenger compartment and the set temperature of the air conditioner in the passenger compartment is not less than a preset reference value, this hybrid vehicle restarts the engine even in a vehicle stop state or in a motor drive mode using the power of an electric motor alone for driving and utilizes the heat produced by the engine to heat the passenger compartment. Here the reference value is set to increase with an increase in temperature of cooling water in the engine.

One proposed measure for the improved fuel economy shortens the purge time of evaporated fuel adsorbed in a canister in the low outside air temperature condition (see, for example, Japanese Patent Laid-Open Gazette No. H08-14118).

DISCLOSURE OF THE INVENTION

In the hybrid vehicle of the proposed arrangement for utilizing the heat produced by the engine to heat the passenger compartment, the engine restarts to produce the heat required for heating the passenger compartment, even in the motor drive mode using the power of the electric motor alone for driving. In the low temperature state, however, a relatively long time is required to increase the temperature of cooling water in the engine. This worsens the fuel economy.

The short purge time of the evaporated fuel adsorbed in the canister improves the fuel economy in the low outside air temperature condition, but this measure does not take into account acceleration of the warm-up of the engine.

In a motor vehicle of the invention and a control method of an internal combustion engine, there is a need of improving fuel economy. In the motor vehicle of the invention and the control method of the internal combustion engine, there is also a need of accelerating warm-up of the internal combustion engine.

In order to attain at least part of the above and the other related objects, the motor vehicle of the invention and the control method of the internal combustion engine have the configurations discussed below.

The present invention is directed to a motor vehicle equipped with an internal combustion engine as a power source. The motor vehicle includes: an evaporated fuel processing system that adsorbs evaporated fuel in a fuel tank, which stores a fuel to be supplied to the internal combustion engine, and introduces the adsorbed evaporated fuel into an air intake system of the internal combustion engine by means of a negative pressure in the air intake system, with a view to processing the evaporated fuel; a heating system that utilizes the internal combustion engine as a heat source to heat a passenger compartment; a low temperature state identification module that identifies whether the motor vehicle is in a specific low temperature state; and a control module that, upon identification of a non-specific low temperature state by the low temperature state identification module, performs evaporated fuel processing acceleration control prior to negative pressure reduction control and, upon identification of the specific low temperature state by the low temperature state identification module, performs the negative pressure reduction control prior to the evaporated fuel processing acceleration control. The evaporated fuel processing acceleration control regulates operation of the internal combustion engine with setting a high level of the negative pressure in the air intake system for acceleration of the processing of the evaporated fuel by the evaporated fuel processing system, and the negative pressure reduction control regulates the operation of the internal combustion engine with setting a lower level of the negative pressure in the air intake system than the level of the negative pressure set in the evaporated fuel processing acceleration control.

In the motor vehicle of the invention, upon identification of the non-specific low temperature state, the evaporated fuel processing acceleration control is performed prior to the negative pressure reduction control. The evaporated fuel processing acceleration control regulates the operation of the internal combustion engine with setting the high level of the negative pressure in the air intake system for acceleration of the processing of the evaporated fuel by the evaporated fuel processing system. The negative pressure reduction control regulates the operation of the internal combustion engine with setting the lower level of the negative pressure in the air intake system than the level of the negative pressure set in the evaporated fuel processing acceleration control. The preferential performance of the evaporated fuel processing acceleration control effectively processes the evaporated fuel when the motor vehicle is not in the specific low temperature state. Upon identification of the specific low temperature state, on the other hand, the motor vehicle of the invention performs the negative pressure reduction control prior to the evaporated fuel processing acceleration control. The preferential performance of the negative pressure reduction control desirably improves the fuel economy during the operation of the internal combustion engine to be used as the heat source for heating the passenger compartment.

In one preferable embodiment of the motor vehicle of the invention, the control module performs the negative pressure reduction control upon identification of the specific low temperature state during a warm-up time of the internal combustion engine. This arrangement improves the fuel economy and ensures the good emission during the warm-up time of the internal combustion engine.

In another preferable embodiment of the motor vehicle of the invention, the negative pressure reduction control performed by the control module upon identification of the specific low temperature state regulates the operation of the internal combustion engine with setting a greater throttle opening than a throttle opening set in the evaporated fuel processing acceleration control. Further, the negative pressure reduction control performed by the control module upon identification of the specific low temperature state may regulate the operation of the internal combustion engine with setting a lower rotation speed of the internal combustion engine than a rotation speed of the internal combustion engine set in the evaporated fuel processing acceleration control.

Moreover, the negative pressure reduction control performed by the control module upon identification of the specific low temperature state may regulate the operation of the internal combustion engine with setting a higher torque of the internal combustion engine than a torque of the internal combustion engine set in the evaporated fuel processing acceleration control.

In one aspect of the invention, the motor vehicle further includes a temperature measurement unit that measures at least one of an intake air temperature, a fuel temperature, a passenger compartment temperature, and an outside air temperature. The low temperature state identification module may identify whether the motor vehicle is in the specific low temperature state, based on a measurement result of at least one of the intake air temperature, the fuel temperature, the passenger compartment temperature, and the outside air temperature by the temperature measurement unit. This arrangement adequately identifies and handles the motor vehicle in the specific low temperature state, based on the intake air temperature, the fuel temperature, the passenger compartment temperature, and the outside air temperature.

In another aspect of the motor vehicle of the invention, the low temperature state identification module identifies whether the motor vehicle is in the specific low temperature state, based on the presence or the absence of a heating requirement for heating the passenger compartment by the heating system. This arrangement adequately identifies and handles the motor vehicle in the specific low temperature state, based on the presence or the absence of the heating requirement for heating the passenger compartment.

In still another aspect of the invention, the motor vehicle further includes: an exhaust recirculation system that recirculates at least part of exhaust from the internal combustion engine into the air intake system of the internal combustion engine. In this aspect, the negative pressure reduction control performed by the control module upon identification of the specific low temperature state may regulate the operation of the internal combustion engine with setting a greater recirculation rate of the exhaust into the air intake system by the exhaust recirculation system than a recirculation rate of the exhaust set in the evaporated fuel processing acceleration control. This arrangement desirably accelerates the warm-up of the internal combustion engine. In one preferable embodiment of this aspect, the motor vehicle further has: a cooling and warm-up accelerating system that includes a heat exchanger to cool down a cooling medium through heat exchange with the outside air; and a warm-up time control module. The cooling and warm-up accelerating system switches over a cooling medium flow path between ordinary circulation of the cooling medium and bypass circulation of the cooling medium. The ordinary circulation makes the cooling medium flow through the heat exchanger, the internal combustion engine, and part of the exhaust recirculation system in this sequence to cool down the internal combustion engine and the part of the exhaust recirculation system. The bypass circulation makes the cooling medium bypass the heat exchanger and flow through only the internal combustion engine and the part of the exhaust recirculation system to accelerate warm-up of the internal combustion engine. Upon identification of the non-specific low temperature state by the low temperature state identification module during a warm-up time of the internal combustion engine, the warm-up time control module controls the cooling and warm-up accelerating system to switch over the cooling medium flow path to the ordinary circulation and cool down the internal combustion engine and the part of the exhaust recirculation system. Upon identification of the specific low temperature state by the low temperature state identification module during the warm-up time of the internal combustion engine, the warm-up time control module controls the cooling and warm-up accelerating system to switch over the cooling medium flow path to the bypass circulation and accelerate the warm-up of the internal combustion engine. This arrangement more effectively accelerates the warm-up of the internal combustion engine.

In still another aspect of the invention, the motor vehicle further having: a variable speed change transmission mechanism that transmits power of the internal combustion engine to a predetermined axle after variable speed change. Further, in still another aspect of the invention, the motor vehicle further including: a generator that has power generation ability of utilizing power of the internal combustion engine to generate electric power; and a motor that is driven with the electric power generated by the generator. In this case, the motor vehicle may further include: a three shaft-type power input output structure that is linked to three shafts, an output shaft of the internal combustion engine, a driveshaft linked with a predetermined axle, and a rotating shaft of the generator, and inputs and outputs power from and to a residual one shaft based on powers input from and output to any two shafts among the three shafts, and the motor may be linked with either the predetermined axle or a different axle. Moreover, the generator maybe a pair-rotor motor generator that has a first rotor connected to an output shaft of the internal combustion engine and a second rotor connected to a driveshaft linked with a predetermined axle and is driven to relatively rotate through electromagnetic interaction between the first rotor and the second rotor, and the motor may be linked with either the predetermined axle or a different axle.

The present invention is also directed to a control method of an internal combustion engine mounted on a motor vehicle, and the motor vehicle has: the internal combustion engine as a power source; an evaporated fuel processing system that adsorbs evaporated fuel in a fuel tank, which stores a fuel to be supplied to the internal combustion engine, and introduces the adsorbed evaporated fuel into an air intake system of the internal combustion engine by means of a negative pressure in the air intake system, with a view to processing the evaporated fuel; and a heating system that utilizes the internal combustion engine as a heat source to heat a passenger compartment. The control method includes: identifying whether the motor vehicle is in a specific low temperature state; and upon identification of a non-specific low temperature state, performing evaporated fuel processing acceleration control prior to negative pressure reduction control and, upon identification of the specific low temperature state, performing the negative pressure reduction control prior to the evaporated fuel processing acceleration control. The evaporated fuel processing acceleration control regulates operation of the internal combustion engine with setting a high level of the negative pressure in the air intake system for acceleration of the processing of the evaporated fuel by the evaporated fuel processing system, and the negative pressure reduction control regulates the operation of the internal combustion engine with setting a lower level of the negative pressure in the air intake system than the level of the negative pressure set in the evaporated fuel processing acceleration control.

In the control method of the internal combustion engine of the invention, upon identification of the non-specific low temperature state, the evaporated fuel processing acceleration control is performed prior to the negative pressure reduction control. The evaporated fuel processing acceleration control regulates the operation of the internal combustion engine with setting the high level of the negative pressure in the air intake system for acceleration of the processing of the evaporated fuel by the evaporated fuel processing system. The negative pressure reduction control regulates the operation of the internal combustion engine with setting the lower level of the negative pressure in the air intake system than the level of the negative pressure set in the evaporated fuel processing acceleration control. The preferential performance of the evaporated fuel processing acceleration control effectively processes the evaporated fuel when the motor vehicle is not in the specific low temperature state. Upon identification of the specific low temperature state, on the other hand, the control method of the invention performs the negative pressure reduction control prior to the evaporated fuel processing acceleration control. The preferential performance of the negative pressure reduction control desirably improves the fuel economy during the operation of the internal combustion engine to be used as the heat source for heating the passenger compartment.

BEST MODES OF CARRYING OUT THE INVENTION

Figure 1:
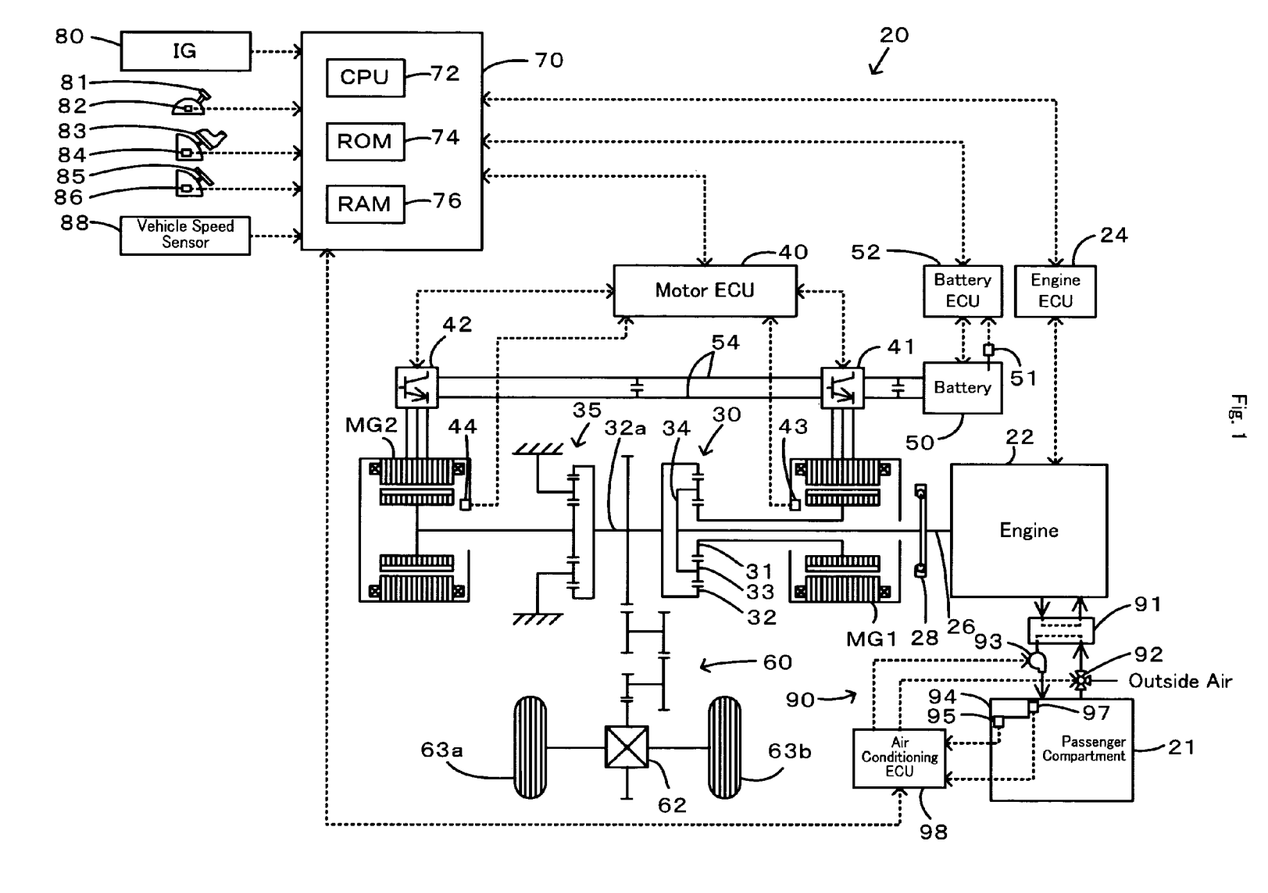
FIG. 1 schematically illustrates the configuration of a hybrid vehicle in one embodiment of the invention.

One mode of carrying out the invention is discussed below as a preferred embodiment with reference to the accompanied drawings. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a reduction gear 35 that is attached to a ring gear shaft 32a or a driveshaft linked to the power distribution integration mechanism 30, a motor MG2 that is linked to the reduction gear 35, an air conditioning system 90 that conditions the air in a passenger compartment 21, and a hybrid electronic control unit 70 that controls the operations of the whole hybrid vehicle 20.

Figure 2:
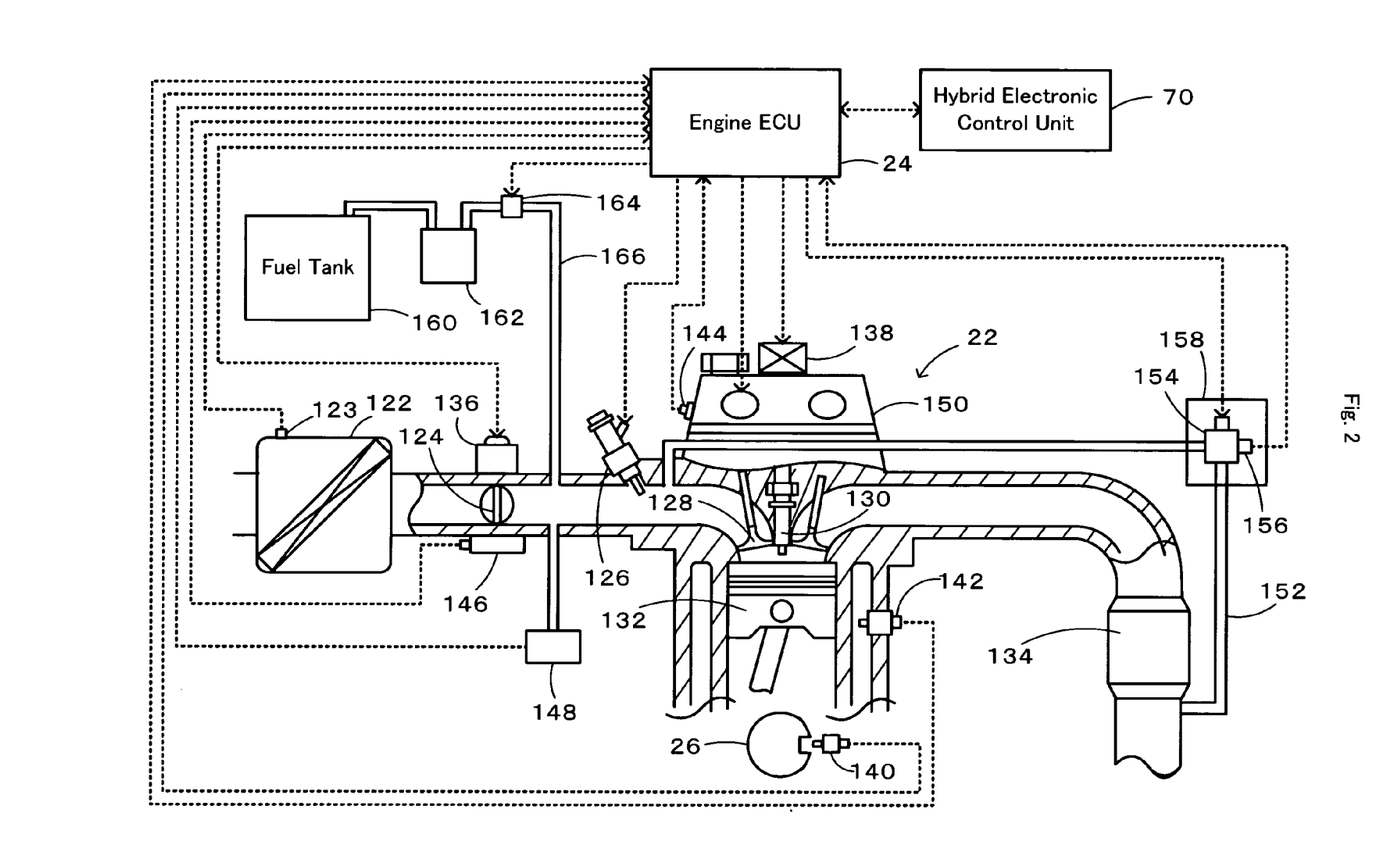
FIG. 2 schematically shows the structure of an engine mounted on the hybrid vehicle of the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through a catalytic converter 134 (filled with a three-way catalyst) to convert toxic components included in the exhaust, that is, carbon monoxide (CO), hydrocarbons (HC), and nitrogen oxides (NOx), into harmless components, and is discharged to the outside air. An EGR pipe 152 is provided downstream of the catalytic converter 134 to recirculate the flow of exhaust to the air intake system. In the structure of the engine 22, the uncombusted gas discharged as the exhaust is flowed into the air intake system to be mixed with the intake air and is further mixed with the atomized fuel to the air-fuel mixture, which is introduced into the combustion chamber. A purge pipe 166 is led from a canister 162 filled with an adsorbent for adsorbing the evaporated fuel from the fuel tank 160 and is connected downstream of the throttle valve 124 of an intake manifold. In an open position of a purge valve 164 provided in the purge pipe 166, the evaporated fuel is sucked into the intake manifold by the negative pressure in the intake manifold and is used as part of the air-fuel mixture.

Figure 3:
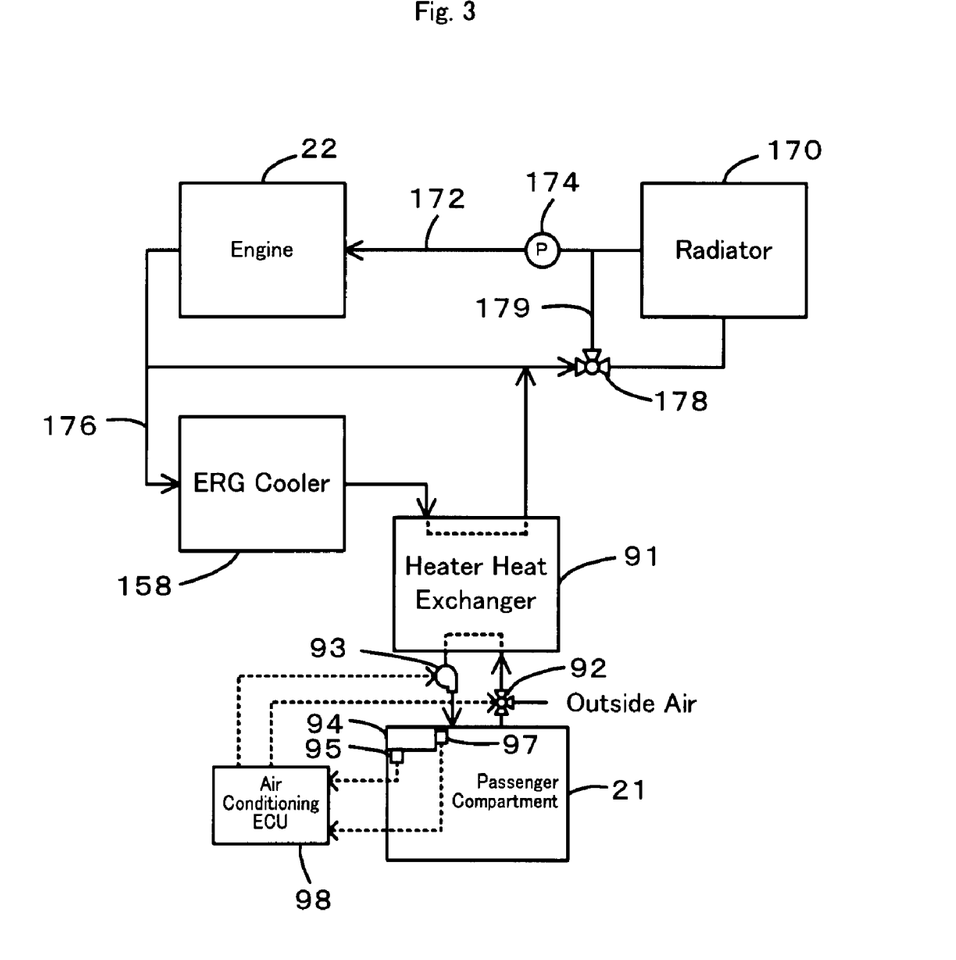
FIG. 3 shows the structure of a cooling system for the engine and an air conditioning system.

FIG. 3 shows the structure of a cooling system for the engine 22 and the air conditioning system 90. The cooling system for the engine 22 mainly includes a fan-equipped radiator 170 that cools down the flow of cooling water, which has passed through the engine 22 to lower the temperature of the engine 22, by means of heat exchange with the outside air, and a circulation pump 174 that is provided in a circulation flow path 172 to make a circulation between the engine 22 and the radiator 170. A branch pipe 176 is provided in the circulation flow path 172 downstream of the engine 22 to lead a branched flow of cooling water to an EGR cooler 158. The EGR cooler 158 cools down an ERG valve 154, which regulates the flow rate of the EGR gas flowed through the EGR pipe 152 and the flow rate of the exhaust recirculated to the air intake system. The branched flow of cooling water from the EGR cooler 158 is led to a heater heat exchanger 91, which is used for heat exchange with the air conditioning system 90. The cooling water is subjected to heat exchange in the heater heat exchanger 91 and is returned to the circulation flow path 172. A three-way valve 178 and a bypass pipe 179 are provided in the circulation flow path 172 to allow circulation of cooling water bypassing the radiator 170.

The engine 22 is under control of an engine electronic control unit 24 (hereafter referred to as engine ECU 24). The engine ECU 24 inputs, via its non-illustrated input port, signals from various sensors that measure and detect the conditions of the engine 22. The signals input into the engine ECU 24 via the input port include an intake air temperature Ta from an intake air temperature sensor 123 attached to the air cleaner 122, a crank position from a crank position sensor 140 detected as the rotational position of the crankshaft 26, a cooling water temperature from a water temperature sensor 142 measured as the temperature of cooling water in the engine 22, and a cam position from a cam position sensor 144 detected as the rotational position of a camshaft driven to open and close the intake valve 128 and an exhaust valve for gas intake and exhaust into and from the combustion chamber. The input signals also include a throttle valve position from a throttle valve position sensor 146 detected as the opening or position of the throttle valve 124, an intake air flow rate from a vacuum sensor 148 measured as the load of the engine 22, and an EGR gas temperature from a temperature sensor 156 measured as the temperature of the EGR gas flowing through the EGR pipe 152. The engine ECU 24 outputs, via its non-illustrated output port, diverse driving signals and control signals to drive and control the engine 22. The signals output from the engine ECU 24 via the output port include driving signals to the fuel injection valve 126, driving signals to a throttle valve motor 136 for regulating the position of the throttle valve 124, control signals to an ignition coil 138 integrated with an igniter, control signals to a variable valve timing mechanism 150 to vary the open and close timings of the intake valve 128, driving signals to the ERG valve 154 for regulating the flow rate of the exhaust recirculated to the air intake system, driving signals to the purge valve 164, and driving signals to the circulation pump 174 and the three-way valve 178 included in the cooling system of the engine 22. The engine ECU 24 communicates with the hybrid electronic control unit 70 to drive and control the engine 22 in response to control signals received from the hybrid electronic control unit 70 and to output data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control and management of a battery electronic control unit 52 (hereafter referred to as battery ECU 52). The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50. The battery ECU 52 sets an input limit Win and an output limit Wout of the battery 50, based on the computed state of charge (SOC) of the battery 50 and the input battery temperature Tb.

As shown in FIGS. 1 and 3, the air conditioning system 90 includes the heater heat exchanger 91 that is provided in the cooling system of the engine 22 to exchange heat with the flow of cooling water, and a blower 93 that sucks either the outside air or the air in the passenger compartment 21 into the heater heat exchanger 91 and blows out the air warmed through heat exchange by the heater heat exchanger 91 to the passenger compartment 21. The air conditioning system 90 also includes a switchover mechanism 92 that switches over the air sucked by the blower 93 between the outside air and the air in the passenger compartment 21, an operation panel 94 that is placed in the passenger compartment 21, and an air conditioning electronic control unit 98 (hereafter referred to as air conditioning ECU 98) that controls the operations of the whole air conditioning system 90. The air conditioning ECU 98 inputs, via its non-illustrated input port, a heater switch signal HSW from a heater switch 95 that is set on the operation panel 94 to be operated by the driver or the passenger to turn on and off a heater, and a passenger compartment temperature Tin from a temperature sensor 97 that is set on the operation panel 94 to measure the temperature in the passenger compartment 21. The air conditioning ECU 98 drives and regulates the blower 93 to make the passenger compartment temperature Tin approach to a preset target temperature, in response to these input signals. The air conditioning ECU 98 communicates with the hybrid electronic control unit 70 to output data regarding the operating conditions of the air conditioning system 90 to the hybrid electronic control unit 70 according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, the battery ECU 52, and the air conditioning ECU 98 via its communication port to receive and send the diversity of control signals and data from and to the engine ECU 24, the motor ECU 40, the battery ECU 52, and the air conditioning ECU 98, as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
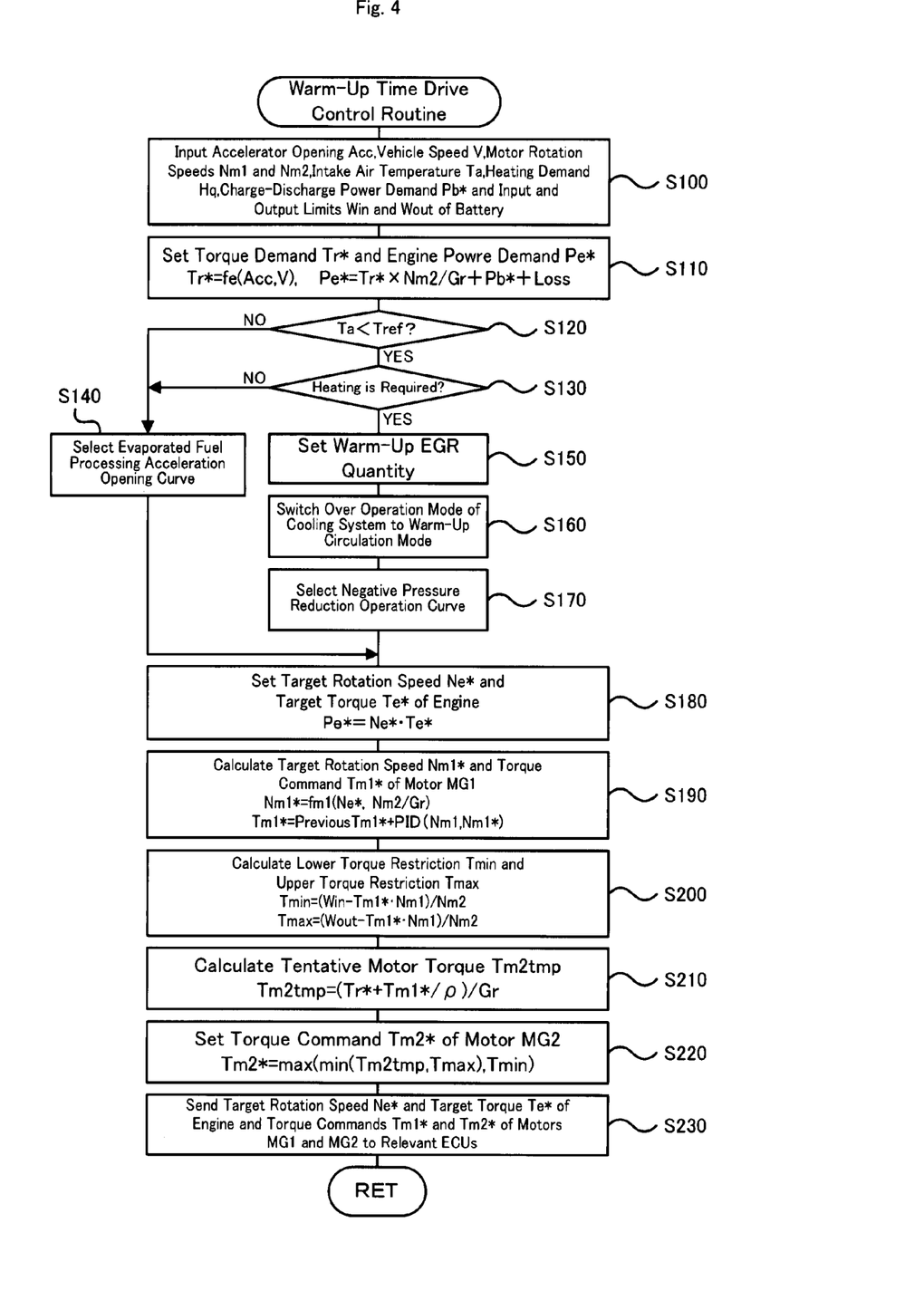
FIG. 4 is a flowchart showing a warm-up time drive control routine.

The description regards the operations of the hybrid vehicle 20 of the embodiment having the configuration discussed above, especially a series of operation control during the warm-up time of the engine 22. FIG. 4 is a flowchart showing a warm-up time drive control routine executed by the hybrid electronic control unit 70 in the hybrid vehicle 20 of the embodiment. This warm-up time drive control routine is performed repeatedly at preset time intervals, for example, at every several msec.

Figure 5:
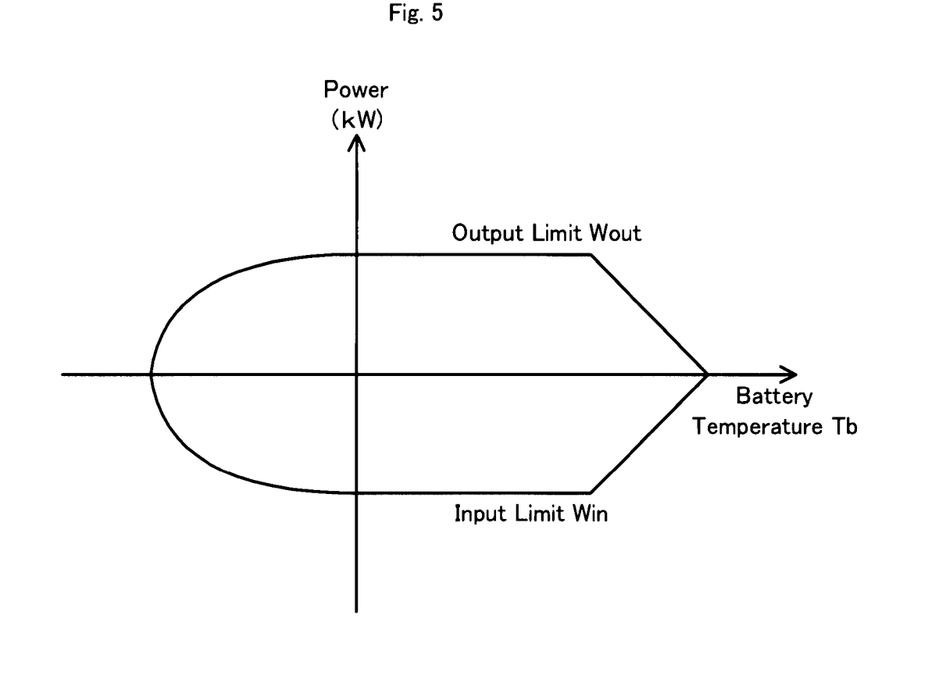
FIG. 5 shows variations of an input limit Win and an output limit Wout against battery temperature Tb of a battery.
Figure 6:
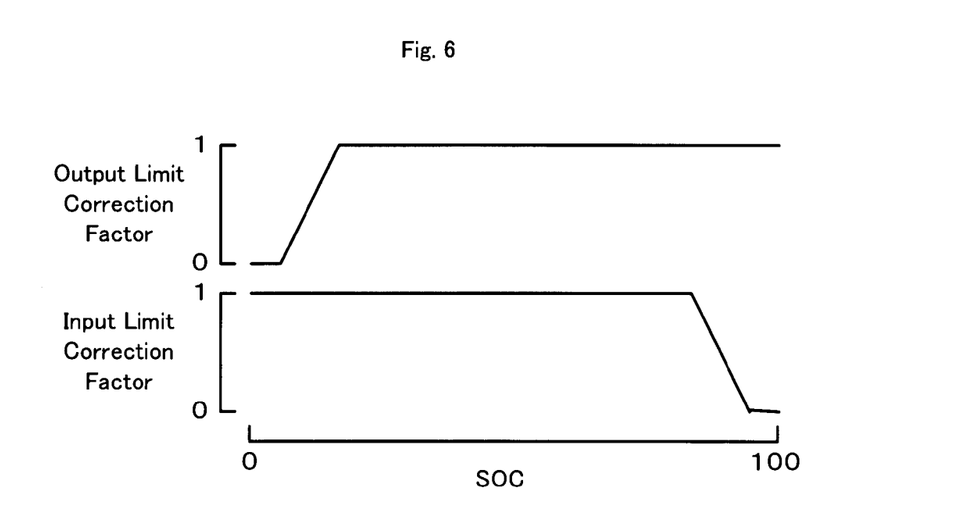
FIG. 6 shows variations of an input limit correction factor and an output limit correction factor against the state of charge SOC of the battery.

In the warm-up time drive control routine of FIG. 4, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the intake air temperature Ta, a heating demand Hq, a charge-discharge power demand Pb*, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The intake air temperature Ta is measured by the intake air temperature sensor 123 and is received from the engine ECU 24 by communication. The heating demand Hq reflects the setting of the heater switch signal HSW output from the heater switch 95 and is received from the air conditioning ECU 98 by communication. The charge-discharge power demand Pb* is set corresponding to the state of charge (SOC) of the battery 50 and is received from the battery ECU 52 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 5 shows variations of the input limit Win and the output limit Wout against the battery temperature Tb. FIG. 6 shows variations of the input limit correction factor and the output limit correction factor against the state of charge SOC of the battery 50.

Figure 7:
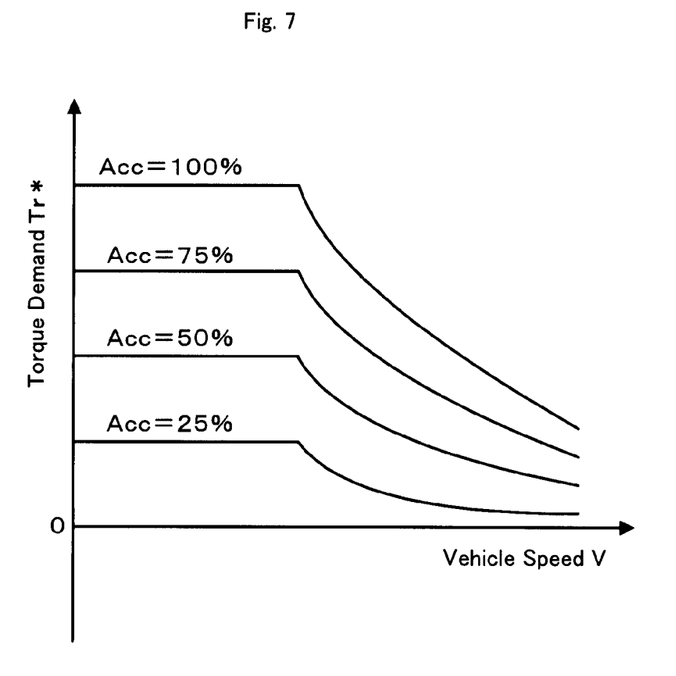
FIG. 7 shows one example of a torque demand setting map.

After the data input, the CPU 72 sets a torque demand Tr* to be output to the ring gear shaft 32a or the driveshaft linked to the drive wheels 63a and 63b as a torque required for the hybrid vehicle 20 and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 7. The engine power demand Pe* is calculated as the sum of the product of the torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 8:
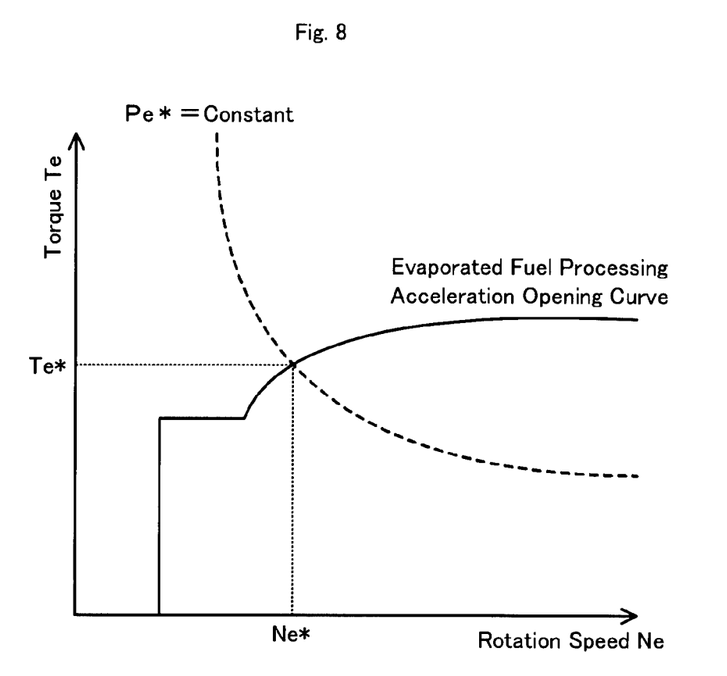
FIG. 8 shows an evaporated fuel processing acceleration operation curve of the engine to set a target rotation speed Ne* and a target torque Te* of the engine.

The CPU 72 then compares the input intake air temperature Ta with a preset reference temperature Tref (step S120) and determines whether the setting of the input heating demand Hq requires heating (step S130). The results of such comparison and determination identify whether the hybrid vehicle 20 is in a low temperature state. The reference temperature Tref is given as a temperature having a relatively low potential for evaporation of the fuel in the fuel tank 160, and is set equal to, for example, 5° C. or 10° C. When the intake air temperature Ta is not lower than the preset reference temperature Tref (step S120: no) or when the setting of the heating demand Hq does not require heating (step S130: no) even in the condition of the intake air temperature Ta of lower than the preset reference temperature Tref (step S120: yes), it is determined that the hybrid vehicle 20 is not in the low temperature state. The CPU 72 accordingly selects an evaporated fuel processing acceleration operation curve (step S140). The evaporated fuel processing acceleration operation curve sets a higher negative pressure in the intake manifold to enable easy suction of the evaporated fuel adsorbed in the canister 162 and to accelerate the processing of the evaporated fuel. A target rotation speed Ne* and a target torque Te* of the engine 22 are set according to the evaporated fuel processing acceleration operation curve selected at step S140 (step S180). FIG. 8 shows one example of the evaporated fuel processing acceleration operation curve to set the target rotation speed Ne* and the target torque Te* of the engine 22. As shown in FIG. 8, the target rotation speed Ne* and the target torque Te* of the engine 22 are given as an intersection of the evaporated fuel processing acceleration operation curve and a curve of constant engine power demand Pe*. The characteristic of the evaporated fuel processing acceleration operation curve will be discussed later in detail.

The CPU 72 calculates a target rotation speed Nm1* of the motor MG1 from the target rotation speed Ne* of the engine 22, the rotation speed Nr(=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S190):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2 \int (Nm1^* - Nm1)dt \quad (2)$$

Figure 9:
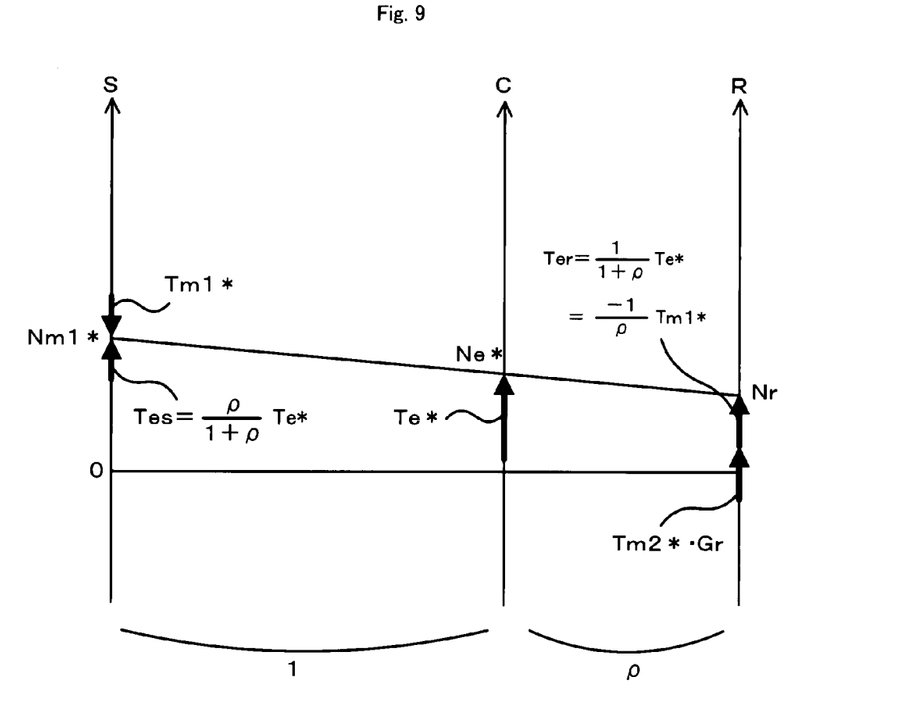
FIG. 9 is an alignment chart showing torque-rotation speed dynamics of respective rotational elements of a power distribution integration mechanism included in the hybrid vehicle of the embodiment.

Equation (1) is a dynamic relational expression of the rotation elements included in the power distribution integration mechanism 30. FIG. 9 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by multiplying the rotation speed Nm2 of the motor MG2 by the gear ratio Gr of the reduction gear 35. Equation (1) is readily introduced from the alignment chart of FIG. 9. Two upward thick arrows on the axis 'R' in FIG. 9 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques that may be output from the motor MG2, according to Equations (3) and (4) given below (step S200):

$$Tmin = (Win - Tm1^* \cdot Nm1)/Nm2 \quad (3)$$

$$Tmax = (Wout - Tm1^* \cdot Nm1)/Nm2 \quad (4)$$

The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. The upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S210):

$$Tm2tmp = (Tr^* + Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S220). Setting the torque command Tm2* of the motor MG2 in this manner restricts the torque demand Tr* to be output to the ring gear shaft 32a or the driveshaft within the ranges of the input limit Win and the output limit Wout of the battery 50. Equation (5) is readily introduced from the alignment chart of FIG. 9.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S230) and exits from the warm-up time drive control routine of FIG. 4. The engine ECU 24 receives the settings of the target rotation speed Ne* and the target torque Te* and performs fuel injection control and ignition control of the engine 22 to drive the engine 22 at a specified drive point of the target rotation speed Ne* and the target torque Te*. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*.

Figure 10:
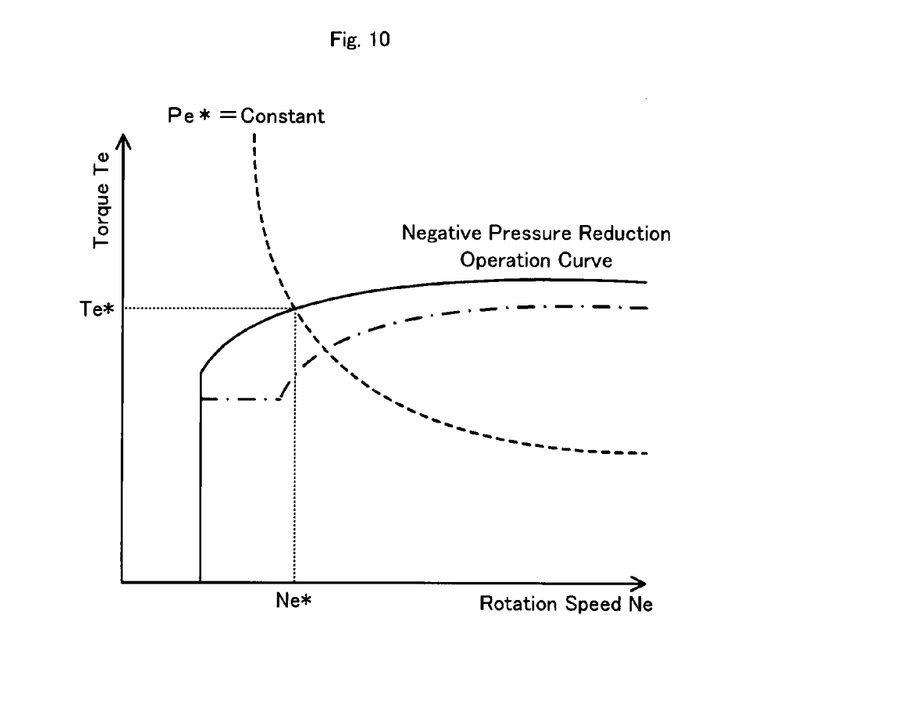
FIG. 10 shows a negative pressure reduction operation curve of the engine to set the target rotation speed Ne* and the target torque Te* of the engine.

When the input intake air temperature Ta is lower than the preset reference temperature Tref (step S120: yes) and when the setting of the heating demand Hq requires heating (step S130: yes), on the other hand, it is determined that the hybrid vehicle 20 is in the low temperature state. In this case, the CPU 72 sets a greater EGR quantity as a warm-up EGR quantity (step S150). The warm-up EGR quantity is greater than an ordinary EGR quantity set in the ordinary state where the target drive point of the engine 22 (defined by the combination of the target rotation speed Ne* and the target torque Te*) is set according to the evaporated fuel processing acceleration operation curve. The CPU 72 subsequently switches the operation mode of the cooling system for the engine 22 to a warm-up circulation mode, in order to actuate the three-way valve 178 in the cooling system and make the flow of cooling water bypass the radiator 170 (step S160) Setting the greater EGR quantity and switching over the operation mode of the cooling system to the warm-up circulation mode enable the heat of the exhaust to be led to the heater heat exchanger 91. The CPU 72 then selects a negative pressure reduction operation curve (step S170) and sets the target rotation speed Ne* and the target torque Te* of the engine 22 according to the selected negative pressure reduction operation curve (step S180). The negative pressure reduction operation curve is designed to set a lower negative pressure in the intake manifold, compared with the negative pressure set according to the evaporated fuel processing acceleration operation curve. The warm-up time drive control routine of FIG. 4 executes the processing of and after step S190 and exits from the warm-up time drive control routine of FIG. 4. FIG. 10 shows one example of the negative pressure reduction operation curve to set the target rotation speed Ne* and the target torque Te* of the engine 22. The solid-line curve represents the negative pressure reduction operation curve, while the one dot-chain line curve represents the evaporated fuel processing acceleration operation curve. As shown in FIG. 10, the target rotation speed Ne* and the target torque Te* of the engine 22 are given as an intersection of the negative pressure reduction operation curve and the curve of constant engine power demand Pe*. The target drive point of the engine 22 (defined by the combination of the target rotation speed Ne* and the target torque Te*) set according to the negative pressure reduction operation curve has the lower rotation speed and the greater torque, compared with the target drive point of the engine 22 set according to the evaporated fuel processing acceleration operation curve. The engine ECU 24 controls the engine 22 to have the greater opening of the throttle valve 124 for the operation of the engine 22 at the target drive point set according to the negative pressure reduction operation curve, compared with the opening of the throttle valve 124 for the operation of the engine 22 at the target drive point set according to the evaporated fuel processing acceleration operation curve. The evaporated fuel processing acceleration operation curve is designed to set the target rotation speed Ne* and the target torque Te* of the engine 22 in such a manner that the rotation speed Ne of the engine 22 increases with a decrease in opening of the throttle valve 124. This increases the negative pressure in the intake manifold to enable easy suction of the evaporated fuel adsorbed in the canister 162 and to accelerate the processing of the evaporated fuel. Setting the target drive point of the engine 22 according to the negative pressure reduction operation curve enhances the operation efficiency of the engine 22, thus improving the fuel economy. Setting the target drive point of the engine 22 according to the negative pressure reduction operation curve may, however, lower the processing level of the evaporated fuel in the fuel tank 160 and may cause poor emission. The evaporation of the fuel in the fuel tank 160 is significantly affected by the temperature. At the intake air temperature Ta of lower than the preset reference temperature Tref, there is a low degree of evaporation of the fuel in the fuel tank 160. In the warm-up control at the intake air temperature Ta of lower than the preset reference temperature Tref, the priority of the warm-up accelerating control, that is, the control of reducing the negative pressure in the intake manifold, over the control of accelerating processing of the evaporated fuel in the fuel tank 160 accordingly does not cause the poor emission. Based on this fact, the warm-up drive control of this embodiment selects the negative pressure reduction operation curve to set the target rotation speed Ne* and the target torque Te* of the engine 22, upon condition that the intake air temperature Ta is lower than the preset reference temperature Tref and that the setting of the heating demand Hq requires heating.

In the hybrid vehicle 20 of the embodiment described above, when the intake air temperature Ta is lower than the preset reference temperature Tref and when the setting of the heating demand Hq requires heating, the warm-up time drive control selects the negative pressure reduction operation curve to set the target drive point of the engine 22 (defined by the combination of the target rotation speed Ne* and the target torque Te*), and controls the engine 22 and the motors MG1 and MG2. This effectively improves the fuel economy during the warm-up time of the engine 22 without causing poor emission, compared with the warm-up control of accelerating processing of the evaporated fuel in the fuel tank 160. When the intake air temperature Ta is lower than the preset reference temperature Tref and when the setting of the heating demand Hq requires heating, the warm-up time drive control increases the EGR quantity from the ordinary level and thereby leads the heat of the exhaust to the heater heat exchanger 91. This enables quick supply of the warm air to the passenger compartment 21. In addition to the increased EGR quantity, the operation mode of the cooling system for the engine 22 is switched over to the warm-up circulation mode to make the flow of cooling water bypass the radiator 170. This leads the greater amount of heat of the exhaust to the heater heat exchanger 91 and further accelerates the supply of the warm air to the passenger compartment 21. When the intake air temperature Ta is not lower than the preset reference temperature Tref or when the setting of the heating demand Hq does not require heating even in the condition of the intake air temperature Ta of lower than the preset reference temperature Tref, the warm-up drive control sets the target drive point of the engine 22 (defined by the combination of the target rotation speed Ne* and the target torque Te*) according to the evaporated fuel processing acceleration operation curve and controls the operations of the engine 22 and the motors MG1 and MG2. This ensures good emission of the engine 22.

When the intake air temperature Ta is lower than the preset reference temperature Tref and when the setting of the heating demand Hq requires heating, the hybrid vehicle 20 of the embodiment sets the target drive point of the engine 22 (defined by the combination of the target rotation speed Ne* and the target torque Te*) according to the negative pressure reduction operation curve. In one possible modification, when the intake air temperature Ta is lower than the preset reference temperature Tref, regardless of the setting of the heating demand Hq, the target drive point of the engine 22 (defined by the combination of the target rotation speed Ne* and the target torque Te*) may be set according to the negative pressure reduction operation curve.

In the hybrid vehicle 20 of the embodiment, when the intake air temperature Ta is lower than the preset reference temperature Tref and when the setting of the heating demand Hq requires heating, the warm-up drive control identifies the hybrid vehicle 20 in the low temperature state and sets the target drive point of the engine 22 (defined by the combination of the target rotation speed Ne* and the target torque Te*) according to the negative pressure reduction operation curve. One modified flow of the warm-up drive control may identify the hybrid vehicle 20 in the low temperature state, based on a result of comparison between the temperature of fuel in the fuel tank 160, the air temperature inside the passenger compartment 21, or the air temperature outside the hybrid vehicle 20 and a preset reference temperature, in place of the comparison between the intake air temperature Ta and the preset reference temperature. The setting of the heating demand Hq may be involved in or ignored in the identification of the low temperature state.

In the hybrid vehicle 20 of the embodiment, when the intake air temperature Ta is lower than the preset reference temperature Tref and when the setting of the heating demand Hq requires heating, the warm-up time drive control increases the EGR quantity from the ordinary level and thereby leads the heat of the exhaust to the heater heat exchanger 91. One modified flow of the warm-up drive control may not increase the EGR quantity from the ordinary level. When the warm-up drive control is adopted in a motor vehicle without an EGR pipe for recirculation of the exhaust into the air intake system, there is naturally no processing related to the EGR quantity.

In the hybrid vehicle 20 of the embodiment, when the intake air temperature Ta is lower than the preset reference temperature Tref and when the setting of the heating demand Hq requires heating, the warm-up time drive control switches over the operation mode of the cooling system for the engine 22 to the warm-up circulation mode. One modified flow of the warm-up drive control may not switchover the operation mode of the cooling system for the engine 22 to the warm-up circulation mode.

The hybrid vehicle 20 of the embodiment executes the warm-up drive control routine of FIG. 4 during the warm-up time of the engine 22. Similar drive control may be performed after completion of the warm-up of the engine 22. In such cases, step S150 for setting the greater EGR quantity and step S160 for switching over the operation mode of the cooling system for the engine 22 to the warm-up circulation mode should be omitted from the drive control.

Figure 11:
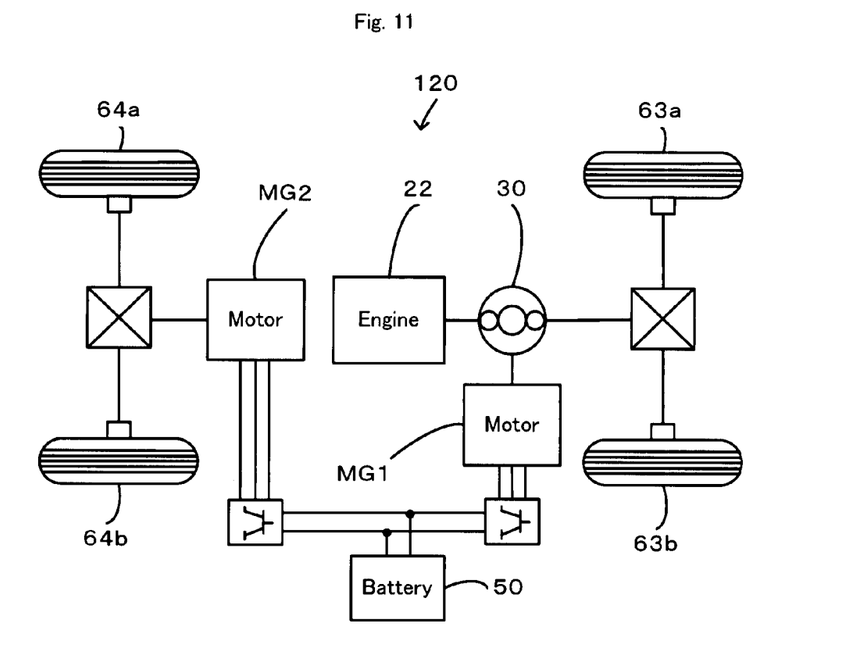
FIG. 11 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
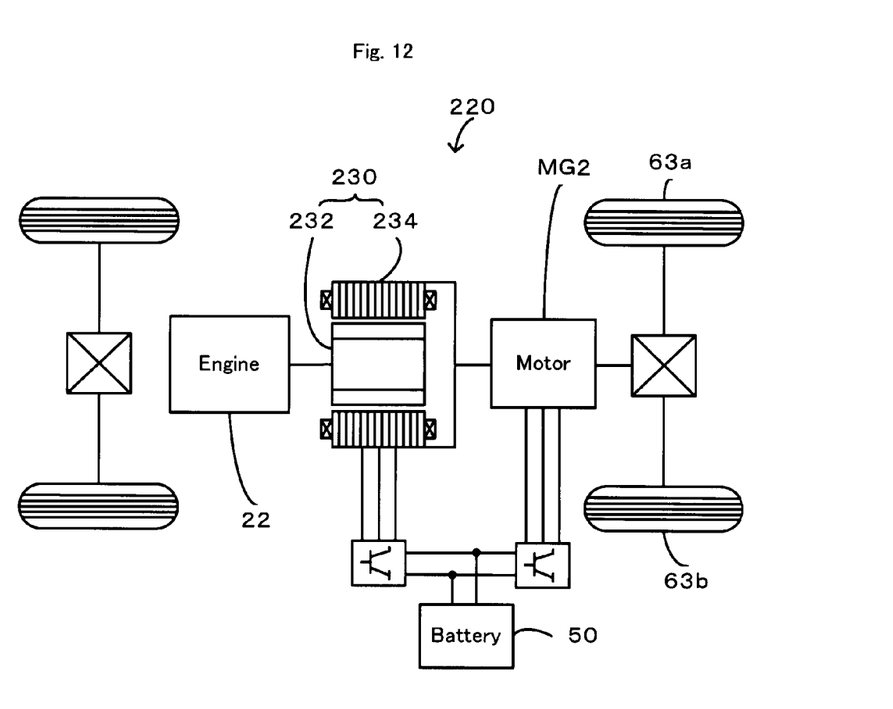
FIG. 12 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

In the hybrid vehicle 20 of the embodiment and the hybrid vehicles 120 and 220 of the modified examples, the power of the engine 22 is subjected to variable speed change by means of the power distribution integration mechanism 30 in combination with the motors MG1 and MG2 and is output to the ring gear shaft 32a or the driveshaft. The technique of the invention is thus applicable to various motor vehicles where the power of the engine 22 goes through variable speed change and is transmitted to a driveshaft linked with an axle, for example, motor vehicles equipped with a CVT (continuously variable transmission) or another variable speed transmission to transmit the power of an engine to an axle after the change speed.

The embodiment regards the hybrid vehicle equipped with the engine 22 and the motors MG1 and MG2. The technique of the invention is applicable to motor vehicles of various structures including an internal combustion engine as a power source, for example, motor vehicle without a motor or a generator.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The principle of the invention is applicable to manufacturing industries of motor vehicles.

The invention claimed is:

1. A motor vehicle equipped with an internal combustion engine as a power source, the motor vehicle comprising:
   an evaporated fuel processing system that adsorbs evaporated fuel in a fuel tank, which stores a fuel to be supplied to the internal combustion engine, and introduces the adsorbed evaporated fuel into an air intake system of the internal combustion engine by means of a negative pressure in the air intake system, with a view to processing the evaporated fuel;
   a heating system that utilizes the internal combustion engine as a heat source to heat a passenger compartment;
   a low temperature state identification module that identifies whether the motor vehicle is in a specific low temperature state; and
   a control module that, upon identification of a non-specific low temperature state by the low temperature state identification module, performs evaporated fuel processing acceleration control prior to negative pressure reduction control and, upon identification of the specific low temperature state by the low temperature state identification module, performs the negative pressure reduction control prior to the evaporated fuel processing acceleration control,
   where the evaporated fuel processing acceleration control regulates operation of the internal combustion engine with setting a high level of the negative pressure in the air intake system for acceleration of the processing of the evaporated fuel by the evaporated fuel processing system, and
   the negative pressure reduction control regulates the operation of the internal combustion engine with setting a lower level of the negative pressure in the air intake system than the level of the negative pressure set in the evaporated fuel processing acceleration control.

2. The motor vehicle in accordance with claim 1, wherein the control module performs the negative pressure reduction control upon identification of the specific low temperature state during a warm-up time of the internal combustion engine.

3. The motor vehicle in accordance with claim 1, wherein the negative pressure reduction control performed by the control module upon identification of the specific low temperature state regulates the operation of the internal combustion engine with setting a greater throttle opening than a throttle opening set in the evaporated fuel processing acceleration control.

4. The motor vehicle in accordance with claim 1, wherein the negative pressure reduction control performed by the control module upon identification of the specific low temperature state regulates the operation of the internal combustion engine with setting a lower rotation speed of the internal combustion engine than a rotation speed of the internal combustion engine set in the evaporated fuel processing acceleration control.

5. The motor vehicle in accordance with claim 1, wherein the negative pressure reduction control performed by the control module upon identification of the specific low temperature state regulates the operation of the internal combustion engine with setting a higher torque of the internal combustion engine than a torque of the internal combustion engine set in the evaporated fuel processing acceleration control.

6. The motor vehicle in accordance with claim 1, the motor vehicle further including:
   a temperature measurement unit that measures at least one of an intake air temperature, a fuel temperature, a passenger compartment temperature, and an outside air temperature,
   wherein the low temperature state identification module identifies whether the motor vehicle is in the specific low temperature state, based on a measurement result of at least one of the intake air temperature, the fuel temperature, the passenger compartment temperature, and the outside air temperature by the temperature measurement unit.

7. The motor vehicle in accordance with claim 1, wherein the low temperature state identification module identifies whether the motor vehicle is in the specific low temperature state, based on the presence or the absence of a heating requirement for heating the passenger compartment by the heating system.

8. The motor vehicle in accordance with claim 1, the motor vehicle further including:
   an exhaust recirculation system that recirculates at least part of exhaust from the internal combustion engine into the air intake system of the internal combustion engine,
   wherein the negative pressure reduction control performed by the control module upon identification of the specific low temperature state regulates the operation of the internal combustion engine with setting a greater recirculation rate of the exhaust into the air intake system by the exhaust recirculation system than a recirculation rate of the exhaust set in the evaporated fuel processing acceleration control.

9. The motor vehicle in accordance with claim 8, the motor vehicle further having:
   a cooling and warm-up accelerating system that includes a heat exchanger to cool down a cooling medium through heat exchange with the outside air, the cooling and warm-up accelerating system switching over a cooling medium flow path between ordinary circulation of the cooling medium and bypass circulation of the cooling medium,
   where the ordinary circulation makes the cooling medium flow through the heat exchanger, the internal combustion engine, and part of the exhaust recirculation system in this sequence to cool down the internal combustion engine and the part of the exhaust recirculation system, and
   the bypass circulation makes the cooling medium bypass the heat exchanger and flow through only the internal combustion engine and the part of the exhaust recirculation system to accelerate warm-up of the internal combustion engine; and
   a warm-up time control module that, upon identification of the non-specific low temperature state by the low temperature state identification module during a warm-up time of the internal combustion engine, controls the cooling and warm-up accelerating system to switch over the cooling medium flow path to the ordinary circulation and cool down the internal combustion engine and the part of the exhaust recirculation system and, upon identification of the specific low temperature state by the low temperature state identification module during the warm-up time of the internal combustion engine, controls the cooling and warm-up accelerating system to switch over the cooling medium flow path to the bypass circulation and accelerate the warm-up of the internal combustion engine.

10. The motor vehicle in accordance with claim 1, the motor vehicle further having:
    a variable speed change transmission mechanism that transmits power of the internal combustion engine to a predetermined axle after variable speed change.

11. The motor vehicle in accordance with claim 1, the motor vehicle further including:
    a generator that has power generation ability of utilizing power of the internal combustion engine to generate electric power; and
    a motor that is driven with the electric power generated by the generator.

12. The motor vehicle in accordance with claim 11, the motor vehicle further including:
    a three shaft-type power input output structure that is linked to three shafts, an output shaft of the internal combustion engine, a driveshaft linked with a predetermined axle, and a rotating shaft of the generator, and inputs and outputs power from and to a residual one shaft based on powers input from and output to any two shafts among the three shafts,
    where the motor is linked with either the predetermined axle or a different axle.

13. The motor vehicle in accordance with claim 11, wherein the generator is a pair-rotor motor generator that has a first rotor connected to an output shaft of the internal combustion engine and a second rotor connected to a driveshaft linked with a predetermined axle and is driven to relatively rotate through electromagnetic interaction between the first rotor and the second rotor, and
    the motor is linked with either the predetermined axle or a different axle.

14. A control method of an internal combustion engine mounted on a motor vehicle, the motor vehicle having: the internal combustion engine as a power source; an evaporated fuel processing system that adsorbs evaporated fuel in a fuel tank, which stores a fuel to be supplied to the internal combustion engine, and introduces the adsorbed evaporated fuel into an air intake system of the internal combustion engine by means of a negative pressure in the air intake system, with a view to processing the evaporated fuel; and a heating system that utilizes the internal combustion engine as a heat source to heat a passenger compartment,
    the control method comprising:
    identifying whether the motor vehicle is in a specific low temperature state; and
    upon identification of a non-specific low temperature state, performing evaporated fuel processing acceleration control prior to negative pressure reduction control and, upon identification of the specific low temperature state, performing the negative pressure reduction control prior to the evaporated fuel processing acceleration control,
    where the evaporated fuel processing acceleration control regulates operation of the internal combustion engine with setting a high level of the negative pressure in the air intake system for acceleration of the processing of the evaporated fuel by the evaporated fuel processing system, and
    the negative pressure reduction control regulates the operation of the internal combustion engine with setting a lower level of the negative pressure in the air intake system than the level of the negative pressure set in the evaporated fuel processing acceleration control.

* * * * *

UNITED STATES PATENT AND TRADEMARK OFFICE
CERTIFICATE OF CORRECTION

PATENT NO.         : 7,430,469 B2
APPLICATION NO. : 11/662056
DATED                 : September 30, 2008
INVENTOR(S)       : Keiji Kaita It is certified that error appears in the above-identified patent and that said Letters Patent is hereby corrected as shown below:

In the Title Page:   Change "(54) MOTOR VEHICLE CONTROL METHOD OF INTERNAL COMBUSTION ENGINE" to --(54) MOTOR VEHICLE AND CONTROL METHOD OF INTERNAL COMBUSTION ENGINE--.

| Column | Line | |
|---|---|---|
| 1 | 1 | Change "MOTOR VEHICLE CONTROL METHOD OF" to --MOTOR VEHICLE AND CONTROL METHOD OF--. |

Signed and Sealed this

Thirtieth Day of December, 2008

JON W. DUDAS
*Director of the United States Patent and Trademark Office*